I. SHERMAN.
Sorghum Evaporator.

No. 28,415.

Patented May 22, 1860.

Witnesses:

Inventor:

UNITED STATES PATENT OFFICE.

ISAAC SHERMAN, OF CLEVELAND, OHIO.

IMPROVEMENT IN EVAPORATING APPARATUS.

Specification forming part of Letters Patent No. 28,415, dated May 22, 1860.

*To all whom it may concern:*

Be it known that I, ISAAC SHERMAN, of Cleveland, in the county of Cuyahoga and State of Ohio, have invented new and useful Improvements in Sorghum-Evaporating Pans; and I do hereby declare that the following is a full and complete description of the construction and operation of the same, reference being had to the accompanying drawings, making part of this specification, in which—

Figure 1:
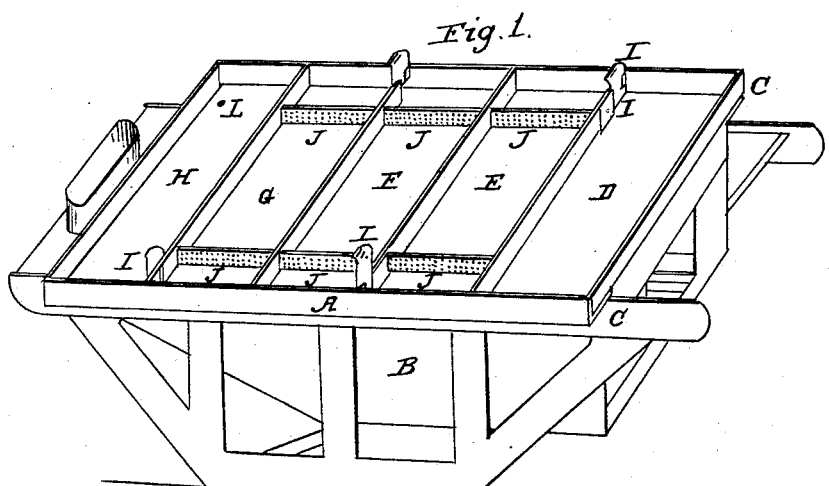
Figure 2:
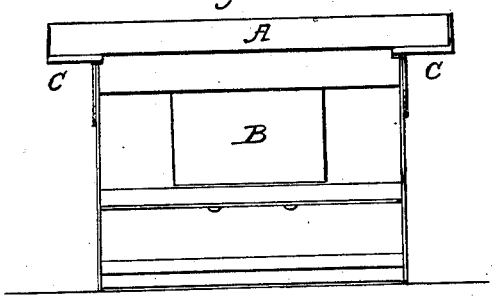
Figure 3:
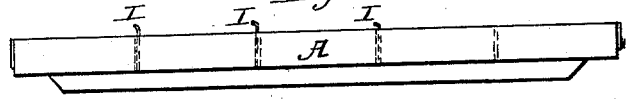
Figure 4:
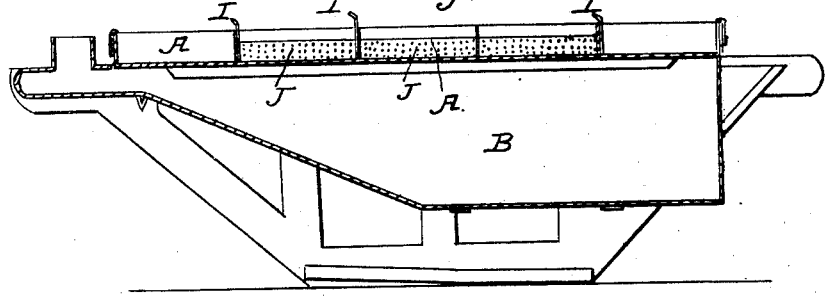

Figure 1 is a perspective view. Fig. 2 is an end view. Fig. 3 is a side view of the pan. Fig. 4 is a vertical longitudinal section.

Like letters refer to like parts in the views.

The nature of my invention relates to the projection of the pan beyond the fire-surface, in combination with the perforated divisions in one or more of the pans, as hereinafter specified, for the purpose of separating the sediment and scum, as hereinafter described.

In the several figures, A represents the pan. This may be set upon a portable fire-box, B, or upon stationary brick-work. In either case the pan should project upon both sides six inches beyond the fire-surface, as at C, leaving, say, of the middle portion, two feet six inches exposed to the direct action of the fire. The pan is divided by partitions into sections D E F G H. Each of these partitions is provided with a gate, I, placed at alternate ends of the partitions. This gate being raised but little, the scum cannot flow through, but is left in the division where it collects. The pan is set so as to slightly incline from D to H, in order that the juice may flow successively from one division to the next. All the sections, except the first and last in the series, are or may be provided at one end or both ends with a perforated plate, J, which is placed about upon the line of the fire-surface upon the bottom of the pan, that portion of the section which is outside of the perforated plate J not being exposed to the action of the heat of the fire. The juice to be evaporated is introduced into the section D, and as it becomes heated a portion of the scum can be removed. It is suffered to flow slowly through the gate I into the section E, where the heat is sufficient to produce a strong ebullition, sufficient to throw any scum or sediment over the top of the perforated plate J, outside of which the liquor will remain in comparative quiet, giving the sediment an opportunity to settle and the scum to collect in these parts where it can be easily removed. Thus the juice flows onward through the gates with any desired rapidity, reaching the section H in a proper state of concentration, to flow out at the exit-pipe L. The sediment that collects in the sections outside of the perforated plates J can at any time be removed by means of a suitable skimmer. The perforated plates, while they allow the free circulation of the juice, prevent the accumulation of sediment in that portion of the pan that is exposed to the direct action of the fire, and prevent, also, the mixing of the raised scum with the boiling liquid. This arrangement is adapted to any kind of saccharine evaporation.

I do not claim extending the bottom of a pan beyond the fire-place, for I am aware that this is a common device that has long been in use; but

What I claim as new, and desire to secure by Letters Patent, is—

Making a sugar-pan as described, having one or more perforated tin strainers across the pan near the outside of the fire-surface, and gates placed transversely outside of the fire-surface, so as to keep any sediment or other impurity from passing into the boiling part of the pan, and, further, to allow the scum that rises from the boiling mass to flow over the strainer and settle there, so that it can be removed at the will of the operator.

ISAAC SHERMAN.

Witnesses:
S. H. MATHER,
J. BRAINERD.